US012781006B2

(12) United States Patent
Kim et al.

(10) Patent No.: US 12,781,006 B2
(45) Date of Patent: Nov. 3, 2026

(54) ANTIMICROBIAL FILM-COATED SUBSTRATE AND MANUFACTURING METHOD THEREFOR

(71) Applicant: LG ELECTRONICS INC., Seoul (KR)

(72) Inventors: Byungsung Kim, Seoul (KR); Hyouk Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 18/871,464

(22) PCT Filed: Jul. 14, 2022

(86) PCT No.: PCT/KR2022/010294
§ 371 (c)(1),
(2) Date: Dec. 3, 2024

(87) PCT Pub. No.: WO2024/014576
PCT Pub. Date: Jan. 18, 2024

(65) Prior Publication Data
US 2025/0353983 A1 Nov. 20, 2025

(51) Int. Cl.
*C08J 7/04* (2020.01)
*A01N 59/20* (2006.01)
(Continued)

(52) U.S. Cl.
CPC ................ *C08J 7/04* (2013.01); *A01N 59/20* (2013.01); *A01P 1/00* (2021.08); *B05D 3/0254* (2013.01);
(Continued)

(58) Field of Classification Search
CPC ......... C08J 7/04; C08J 2300/22; A01N 59/20; A01P 1/00; B05D 3/0254; B05D 7/24;
(Continued)

(56) References Cited

U.S. PATENT DOCUMENTS

2003/0235653 A1 12/2003 Yu
2016/0302420 A1 10/2016 Gedanken et al.
2023/0115585 A1 4/2023 Ito et al.

FOREIGN PATENT DOCUMENTS

KR 1020150010819 1/2015
KR 101841970 3/2018
(Continued)

OTHER PUBLICATIONS

Machine translation, KR-102340958 (Year: 2014).*
(Continued)

*Primary Examiner* — Michael G Miller
(74) *Attorney, Agent, or Firm* — LEE, HONG, DEGERMAN, KANG & WAIMEY

(57) ABSTRACT

The present invention relates to an antimicrobial film coating. More specifically, the present invention relates to an antimicrobial film-coated substrate and a manufacturing method therefor. The method of the present invention for manufacturing an antimicrobial film-coated substrate, in which antimicrobial particles are directly formed, comprises the steps of: preparing a coating solution by mixing a metal salt with a hydrophobic solvent; coating the surface of a plastic or polymer substrate with the coating solution; and heat-treating the coated plastic or polymer substrate to form an antimicrobial particle layer on the surface of the plastic or polymer substrate.

15 Claims, 12 Drawing Sheets

(51) Int. Cl.
*A01P 1/00* (2006.01)
*B05D 3/02* (2006.01)
*B05D 7/24* (2006.01)

(52) U.S. Cl.
CPC ............ *B05D 7/24* (2013.01); *B05D 2201/02* (2013.01); *B05D 2401/10* (2013.01); *B05D 2518/00* (2013.01); *C08J 2300/22* (2013.01)

(58) Field of Classification Search
CPC ............ B05D 2201/02; B05D 2401/10; B05D 2518/00; B05D 3/02; C23C 18/1216; C23C 18/1233; C09D 5/14; C09D 1/00
See application file for complete search history.

(56) References Cited

FOREIGN PATENT DOCUMENTS

| | | | | | |
|---|---|---|---|---|---|
| KR | 102340958 | | | 12/2021 | |
| KR | 102340958 | B1 | * | 12/2021 | ............ A01N 59/00 |
| KR | 20220019425 | A | * | 2/2022 | ............... C08K 9/12 |
| KR | 1020220019425 | | | 2/2022 | |
| WO | 2015091261 | | | 6/2015 | |
| WO | 2018056904 | | | 3/2018 | |
| WO | 2021193940 | | | 9/2021 | |

OTHER PUBLICATIONS

Machine translation, KR-20220019425 (Year: 2022).*
European Patent Office Application Serial No. 22951231.4, Search Report dated Apr. 29, 2025, 14 pages.
Qureshi et al., "Nanoscale Mo—MoO3 Entrapped in Engineering Themoplastic: Inorganic Pathway to Bactericidal and Fungicidal Action," IEEE Transactions on Nanobioscience, vol. 15, No. 3, Apr. 2016, 7 pages.
Padiyath et al., "Plasma Induced Disposition of Copper Films on Polymer Surfaces," Metalized Plastics 2: Fundamental and Applied Aspects, ProQuest Ebook Central, Jan. 1991, 8 pages.
Rodriguez-Llamazares et al., "PVC/Copper Oxide Composites and Their Effect on Bacterial Adherence," Journal of the Chilean Chemical Society, vol. 57, No. 2, Jan. 2012, 3 pages.
PCT International Application No. PCT/KR2022/010294, International Search Report dated Apr. 7, 2023, 9 pages.

* cited by examiner

ANTIMICROBIAL FILM-COATED SUBSTRATE AND MANUFACTURING METHOD THEREFOR

CROSS-REFERENCE TO RELATED APPLICATION(S)

This application is the National Stage filing under 35 U.S.C. 371 of International Application No. PCT/KR2022/010294, filed on Jul. 14, 2022, the contents of which are all incorporated by reference herein in its entirety.

TECHNICAL FIELD

The present disclosure relates to an antimicrobial coating. More specifically, the present disclosure relates to an antimicrobial film-coated substrate and a method of manufacturing the same.

BACKGROUND ART

In general, plastic products require antimicrobial coating because they may come into contact with human hands or be exposed to various environments.

Conventional antimicrobial coatings have been formed by separately synthesizing antimicrobial particles, mixing the antimicrobial particles with polymers for attachment to the desired substrate, and then coating the substrate with the mixture. Therefore, processes such as raw material synthesis, stirring, coating, and heat treatment are required for antimicrobial coating, and there are limitations such as increased process time at each process step and the need for high-concentration antimicrobial agents.

In addition, the antimicrobial performance is actually driven by only a small number of antimicrobial particles exposed to the surface because direct contact with strains is required in terms of the antimicrobial mechanism.

Ultimately, it is impossible to control the distribution of antimicrobial particles in a polymer since a high concentration of antimicrobial particles mixed with the polymer to provide antimicrobial performance is required. Furthermore, there are problems such as reduced product transparency and uneven antimicrobial performance that limit the application of parts in addition to the increase in raw material costs.

Therefore, a solution to these problems is required.

DISCLOSURE

Technical Task

One technical task of the present disclosure is to provide an antimicrobial film-coated substrate and a method of manufacturing the same, which enable direct formation of an antimicrobial particle layer on the surface of a target substrate without using a polymer.

Another technical task of the present disclosure is to provide an antimicrobial film-coated substrate and a method of manufacturing the same, which enable formation of an antimicrobial film using a small quantity of antimicrobial particles.

Another technical task of the present disclosure is to provide an antimicrobial film-coated substrate and a method of manufacturing the same, which enable formation of an antimicrobial film with high light transmittance.

Another technical task of the present disclosure is to provide an antimicrobial film-coated substrate and a method of manufacturing the same, which maintain or increase the degree of design freedom of the parts to which the antimicrobial film is applied.

Technical Solutions

In one technical aspect of the present disclosure, provided is a method of manufacturing an antimicrobial film-coated substrate configured to directly form antimicrobial particles, the method including mixing a metal salt with a hydrophobic solvent to prepare a coating solution, coating a surface of a plastic or polymer substrate with the coating solution, and heat-treating the coated plastic or polymer substrate to form an antimicrobial particle layer on the surface of the plastic or polymer substrate.

In an exemplary embodiment, the hydrophobic solvent may include at least one of ethanol, isopropanol, or methanol.

In an exemplary embodiment, the plastic may be a thermoplastic plastic.

In an exemplary embodiment, the metal salt may include at least one of a metal acetate-based material, a metal chloride-based material, or a metal nitrate-based material.

In an exemplary embodiment, the metal may include copper (Cu).

In an exemplary embodiment, the heat-treating may include inducing an oxidation reaction and an aggregation reaction to fix the antimicrobial particles to the surface of the plastic or polymer substrate.

In an exemplary embodiment, a concentration of the metal salt may be 0.001 M (molar concentration) to 0.1 M.

In an exemplary embodiment, a size of the antimicrobial particles may increase as the concentration of the metal salt increases.

In an exemplary embodiment, transmittance of the antimicrobial particle layer may increase as the concentration of the metal salt decreases.

In an exemplary embodiment, the metal salt may include one of copper (II) acetate ($Cu(CH_3COO)_2$), copper (II) nitrate ($Cu(NO_3)_2$), or copper (I) chloride ($CuCl_2$).

In another technical aspect of the present disclosure, provided is a method of manufacturing an antimicrobial film-coated substrate, the method including mixing a metal salt including at least one of a metal acetate-based material, a metal chloride-based material, or a metal nitrate-based material with an alcohol-based solvent to prepare a coating solution, coating a surface of a plastic or polymer substrate with the coating solution, and heat-treating the coated plastic or polymer substrate to form an antimicrobial particle layer on the surface of the plastic or polymer substrate.

In another technical aspect of the present disclosure, provided is an antimicrobial film-coated substrate including a metal salt including at least one of metal acetate, metal chloride, or metal nitrate directly formed on a surface thereof through an oxidation reaction and an aggregation reaction.

Advantageous Effects

According to one embodiment of the present disclosure, the following effects are provided.

First, according to the embodiment of the present disclosure, it is possible to achieve better performance even with a small quantity of antimicrobial particles.

Therefore, the embodiment of the present disclosure has an advantage of more efficiently forming an antimicrobial particle coating.

In addition, the embodiment of the present disclosure eliminates the necessity of a high concentration of antimicrobial agent or polymer to attach the antimicrobial particles to a desired substrate, and an additional process such as a stirring process, thus greatly reducing the material cost and the number of processes, and minimizing the process time.

In addition, according to the embodiment of the present disclosure, the antimicrobial particle layer is formed on the surface of a thermoplastic plastic or polymer substrate, thus advantageously inducing a rapid antimicrobial reaction upon contact with a strain and maintaining surface antimicrobial performance even with a low concentration of antimicrobial particles.

As such, according to the embodiment of the present disclosure, a copper (I) oxide particle layer with excellent antimicrobial performance is directly formed on the surface of a plastic or polymer substrate without using a polymer, thereby improving the antimicrobial performance of the applied part.

Accordingly, the cost of raw materials may be reduced because a small quantity of antimicrobial particles is used to form an antimicrobial film.

In addition, transparency may be controlled by adjusting the concentration of the coating solution to form an antimicrobial film, thereby maintaining or increasing the design freedom of the applied part.

Furthermore, according to another embodiment of the present disclosure, there are additional effects not mentioned herein. This can be understood by those skilled in the art from the overall disclosure and drawings.

BEST MODE FOR DISCLOSURE

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions.

In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining at least two or more drawings are also within the scope of the present disclosure.

In addition, when an element such as a layer, region or module is described as being "on" another element, it is to be understood that the element may be directly on the other element or there may be an intermediate element between them.

Figure 1:
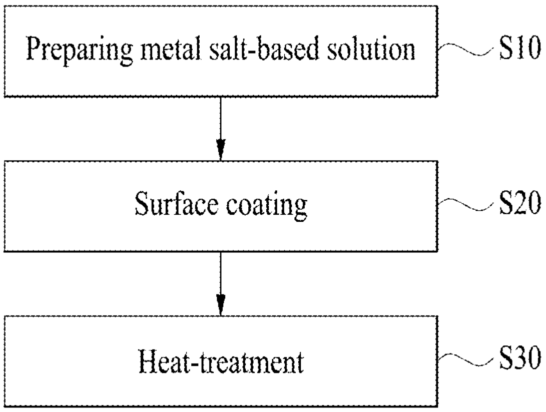
FIG. 1 is a flowchart illustrating a method of manufacturing an antimicrobial film-coated substrate according to one embodiment of the present disclosure.

FIG. 1 is a flowchart illustrating a method of manufacturing an antimicrobial film-coated substrate according to one embodiment of the present disclosure.

Referring to FIG. 1, a method of manufacturing an antimicrobial film-coated substrate according to one embodiment of the present disclosure may include preparing a metal salt-based coating solution (metal salt-based solution) (S10), coating a surface of a substrate with the prepared coating solution (S20), and heat-treating the substrate coated with the coating solution (S30).

The preparing a metal salt-based coating solution (metal salt-based solution) (S10) may be carried out by mixing a metal salt with a hydrophobic solvent.

Here, the hydrophobic solvent may contain at least one of ethanol, isopropanol, or methanol.

As such, embodiments of the present disclosure may be applied to various plastics and complicated structures having hydrophobic properties using an alcohol solution as a hydrophobic solvent.

The substrate coated with the coating solution may be a plastic or polymer substrate. For example, the plastic may be a thermoplastic plastic such as polyethylene, polyethylene terephthalate, polyvinyl chloride, polyvinylidene chloride, polystyrene, or polypropylene.

In addition, the polymer substrate may be a polymer film such as a PE, PET, or PMMA film.

As an exemplary embodiment, the metal salt may include at least one of a metal acetate-based material, a metal chloride-based material, or a metal nitrate-based material.

As an exemplary embodiment, the metal of the metal salt may include copper (Cu). That is, the metal salt may include one of copper (II) acetate ($Cu(CH_3COO)_2$), copper (II) nitrate ($Cu(NO_3)_2$), and copper (I) chloride ($CuCl_2$).

The metal salt including copper may be readily oxidized by low-temperature heat treatment and may be converted into antimicrobial particles on the surface of the substrate.

Such a metal salt may be mixed with an alcohol-based solvent to prepare a coating solution. The coating solution may be coated on the surface of a plastic or polymer substrate by a coating method such as spray coating, dip coating, or spin coating.

Meanwhile, by the heat-treating the substrate coated with the coating solution (S30), an antimicrobial particle layer may be formed on the surface of the plastic or polymer substrate.

This heat-treating process may induce oxidation and aggregation reactions to fix the antimicrobial particles to the surface of the plastic or polymer substrate. In other words, the metal salt can act as an antimicrobial particle.

After coating the thermoplastic plastic or polymer substrate with the metal salt by the above process, the antimicrobial material, i.e., metal oxide, may be formed, and at the same time, the agglomerated antimicrobial particles may be fixed to the surface of the thermoplastic plastic or polymer substrate using surface melting.

The heat-treating is possible at low temperatures. In addition, various heat treatment methods based on plasma or heat-resistant wire may be used to generate antimicrobial particles on the surface of thermoplastic plastics or polymer substrates at low temperatures. In addition, the bond between the antimicrobial particles and the substrate surface can be strengthened by this heat-treating process.

Conventional antimicrobial coatings have been formed by separately synthesizing antimicrobial particles, mixing the antimicrobial particles with polymers for attachment to the desired substrate and coating the substrate with the mixture. Therefore, processes such as raw material synthesis, stirring, coating, and heat treatment are required for antimicrobial coatings and there are limitations such as increased process time at each process step and the need for high concentrations of antimicrobial agents.

In addition, the antimicrobial performance is actually obtained by only a small number of antimicrobial particles exposed to the surface because direct contact with strains is required in terms of the antimicrobial mechanism.

Ultimately, it is impossible to control the distribution of antimicrobial particles in a polymer since a high concentration of antimicrobial particles mixed with the polymer to provide antimicrobial performance is required. Furthermore, there is a problem of limited application to parts due to reduced product transparency and uneven antimicrobial performance in addition to the increase in raw material costs.

However, according to an embodiment of the present disclosure, it is possible to obtain better performance using even a small amount of antimicrobial particles.

For example, according to conventional methods, antimicrobial particles were randomly mixed and coated on a substrate, but the actual antimicrobial performance depended only on the particles exposed to the surface and the rest were inherent in the polymer.

Therefore, an embodiment of the present disclosure has an advantage of more efficiently forming an antimicrobial particle coating.

In addition, according to the embodiment of the present disclosure, since a high concentration of antimicrobial agent or polymer is not required to attach the antimicrobial particles to the desired substrate, and an additional process such as a stirring process is not required, the material cost and the number of processes can be greatly reduced, and the process time can be minimized.

In addition, according to the embodiment of the present disclosure, the antimicrobial particle layer is formed on the surface of the thermoplastic plastic or polymer substrate, thus advantageously inducing a rapid antimicrobial reaction upon contact with the strain and maintaining surface antimicrobial performance even with a low concentration of antimicrobial particles.

As such, according to the embodiment of the present disclosure, a copper (I) oxide particle layer with excellent antimicrobial performance may be directly formed on the surface of the plastic or polymer substrate without using a polymer, thereby improving the antimicrobial performance of the applied part.

Accordingly, a small amount of antimicrobial particles is used to form the antimicrobial film, thus reducing the raw material cost. In addition, by controlling the concentration of the coating solution for forming the antimicrobial film, transparency may be controlled and thus the freedom of design of the applied part may be maintained or increased.

Figure 2:
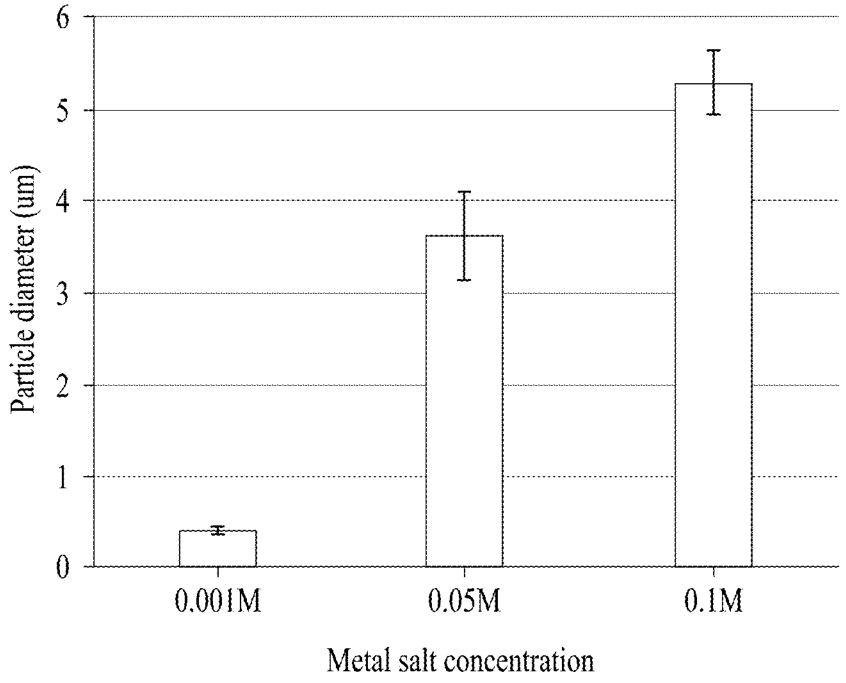
FIG. 2 is a graph showing the distribution of the diameter of antimicrobial particles depending on the concentration of a metal salt in the method of manufacturing an antimicrobial film-coated substrate according to one embodiment of the present disclosure.

FIG. 2 is a graph showing the distribution of the diameter of antimicrobial particles depending on the concentration of a metal salt in the method of manufacturing an antimicrobial film-coated substrate according to one embodiment of the present disclosure.

As described above, a metal salt-based coating solution (metal salt-based solution) for coating a thermoplastic plastic or polymer substrate may be prepared by mixing a metal salt with a hydrophobic solvent (alcohol-based solution).

Here, the hydrophobic solvent may include at least one of ethanol, isopropanol, or methanol.

As a specific example, the metal salt may include one of copper (II) acetate ($Cu(CH_3COO)_2$), copper (II) nitrate ($Cu(NO_3)_2$), and copper (I) chloride ($CuCl_2$). Accordingly, a graph showing an example in which $Cu_2O$ antimicrobial particles are formed on the surface of a thermoplastic plastic or polymer substrate is shown.

FIG. 2 shows the size (diameter) of antimicrobial particles depending on the concentration of the coating solution, that is, the concentration of the metal salt, containing copper as a metal salt.

In other words, the size of the antimicrobial particles formed on the surface of the thermoplastic plastic or polymer substrate may vary depending on the concentration of the metal salt.

In addition, it can be seen that the size of these antimicrobial particles can be controlled by adjusting the concentration of the metal salt-based solution (coating solution).

Referring to FIG. 2, the concentration of the metal salt may be adjusted from 0.001 M (molar concentration) to 0.1 M. Accordingly, for example, the size of the antimicrobial particles formed on the surface of the thermoplastic plastic or polymer substrate may be controlled between about 0.3 μm and about 5.3 μm.

In addition, FIG. 2 shows a tendency for the size of the antimicrobial particles to increase as the concentration of the metal salt increases.

As such, referring to FIG. 2, according to an embodiment of the present disclosure, an antimicrobial film-coated substrate may be manufactured in which a metal salt including at least one of a metal acetate-based material, a metal chloride-based material, or a metal nitrate-based material is directly formed on the surface through an oxidation reaction and an aggregation reaction.

According to this embodiment of the present disclosure, a $Cu_2O$ particle layer may be directly formed on the surface of a thermoplastic plastic or polymer substrate.

FIG. 3 is an image showing antimicrobial particles formed by a method of manufacturing an antimicrobial film-coated substrate according to an embodiment of the present disclosure.

Referring to FIG. 3, the change in the size and density of the antimicrobial particles is shown in a FE-SEM (field emission scanning electron microscope) image.

As such, it can be seen that the size and density of the antimicrobial particles formed on the surface of the thermoplastic plastic or polymer substrate are changed by controlling the concentration of the metal salt coating solution.

Figure 3A:
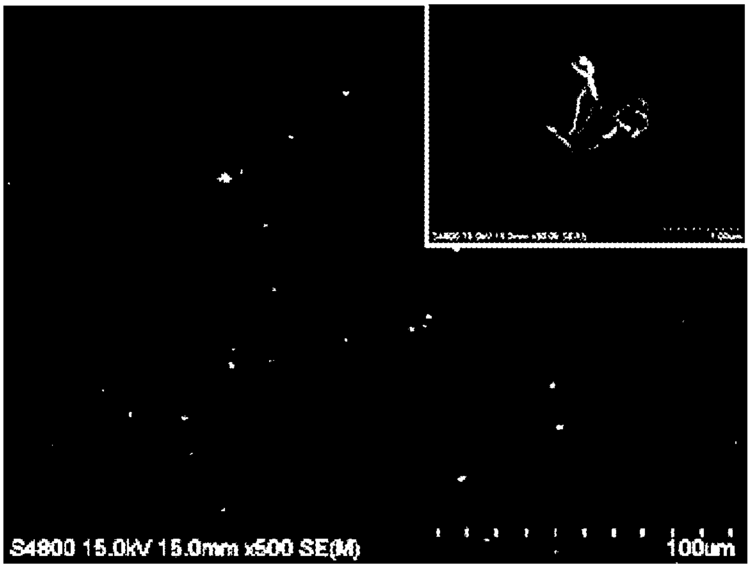
FIG. 3A is an image showing antimicrobial particles when the concentration of the metal salt is 0.001 M (molar concentration)

FIG. 3A is an image showing antimicrobial particles when the concentration of the metal salt, i.e., the concentration of the metal salt-based solution (coating solution), is 0.001 M (molar concentration). An enlarged image is shown in the upper right and it can be seen that this image shows the same tendency as the graph shown in FIG. 2.

Figure 3B:
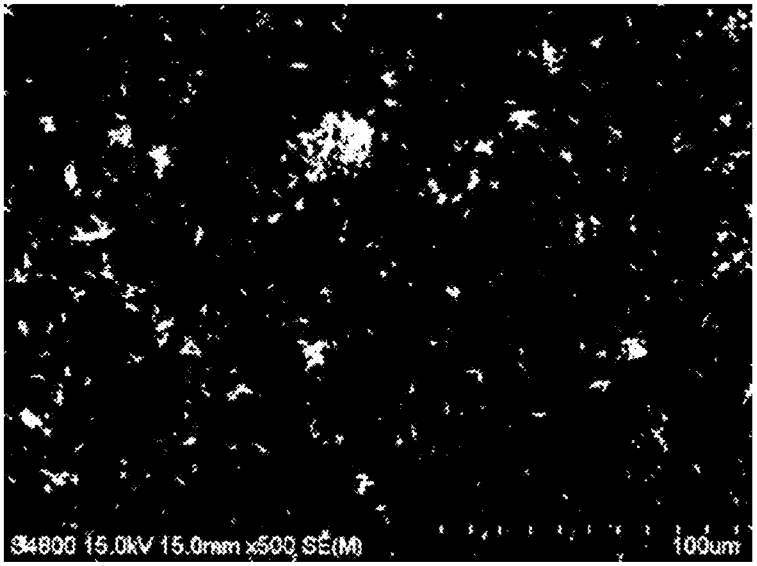
FIG. 3B is an image showing antimicrobial particles when the concentration of the metal salt is 0.05 M.

In addition, FIG. 3B is an image showing antimicrobial particles when the concentration of the metal salt, i.e., the concentration of the metal salt-based solution (coating solution), is 0.05 M (molar concentration). It can be seen from FIG. 3B that, the size of the antimicrobial particles increases as the concentration of the metal salt-based solution (coating solution) increases compared to the case illustrated in FIG. 3A.

Figure 3C:
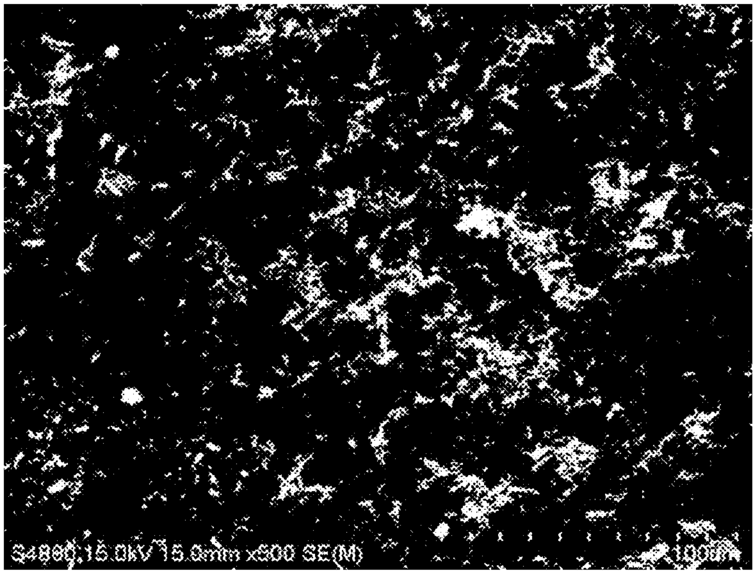
FIG. 3C is an image showing antimicrobial particles when the concentration of the metal salt is 0.1 M.

FIG. 3C is an image showing antimicrobial particles when the concentration of the metal salt, i.e., the concentration of the metal salt-based solution (coating solution), is 0.1 M (molar concentration). Like the case shown in FIG. 3B, FIG. 3C shows that, the size of the antimicrobial particles increases, compared to the case illustrated in FIG. 3B, as the concentration of the metal salt-based solution (coating solution) increases.

FIG. 3 also shows an example where the metal salt includes copper. That is, the image shows an example where $Cu_2O$ antimicrobial particles are formed using a metal salt including one of copper (II) acetate ($Cu(CH_3COO)_2$), copper (II) nitrate ($Cu(NO_3)_2$), and copper (I) chloride ($CuCl_2$).

As such, the size and density of the antimicrobial particles increase as the concentration of the metal salt-based solution (coating solution) increases. That is, the size and density of antimicrobial particles may be controlled by adjusting the concentration of the metal salt-based solution (coating solution).

Figure 4:
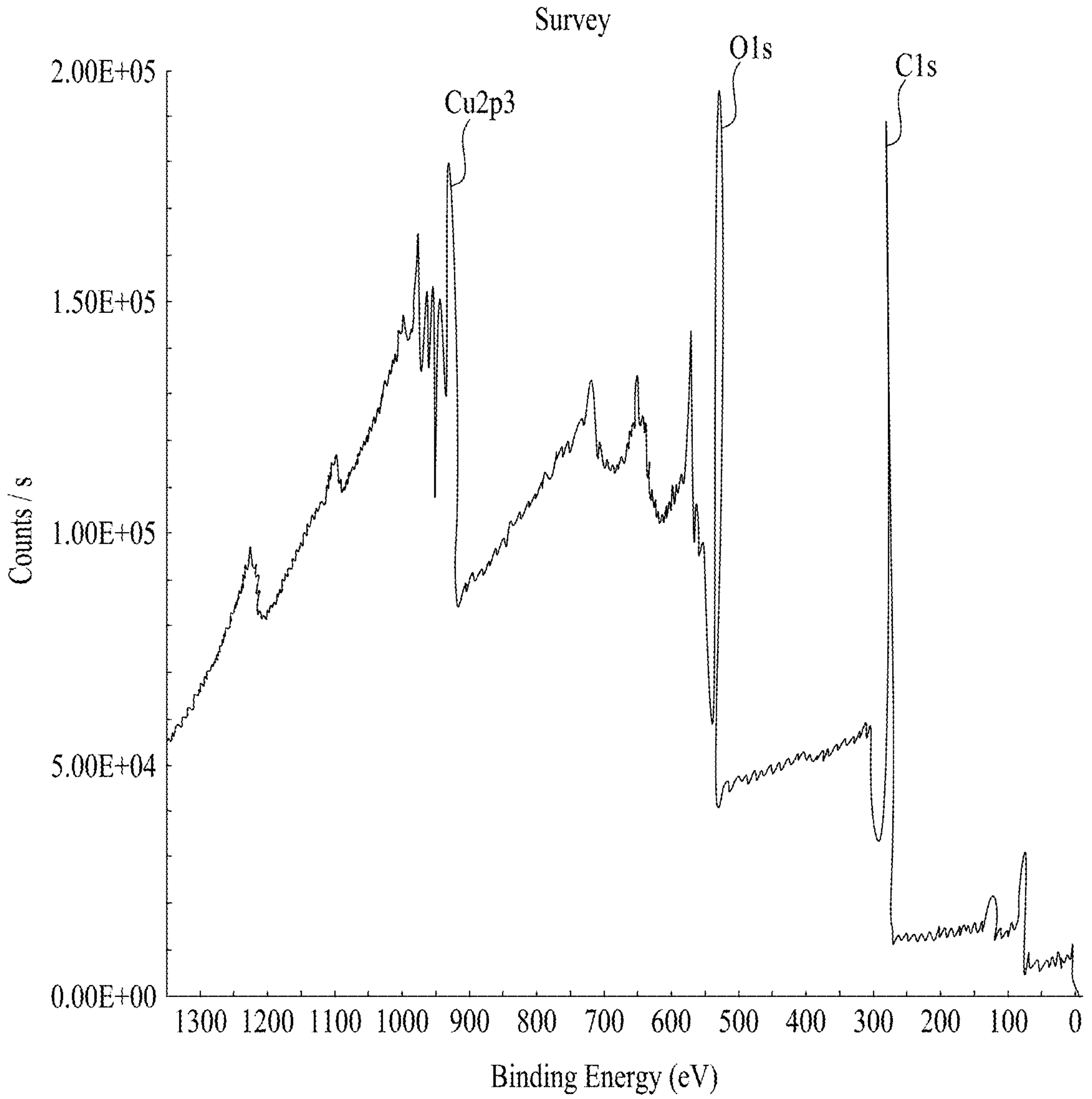
FIGS. 4 and 5 are XPS graphs showing formation of antimicrobial particles using the method of manufacturing an antimicrobial film-coated substrate according to one embodiment of the present disclosure.
Figure 5:
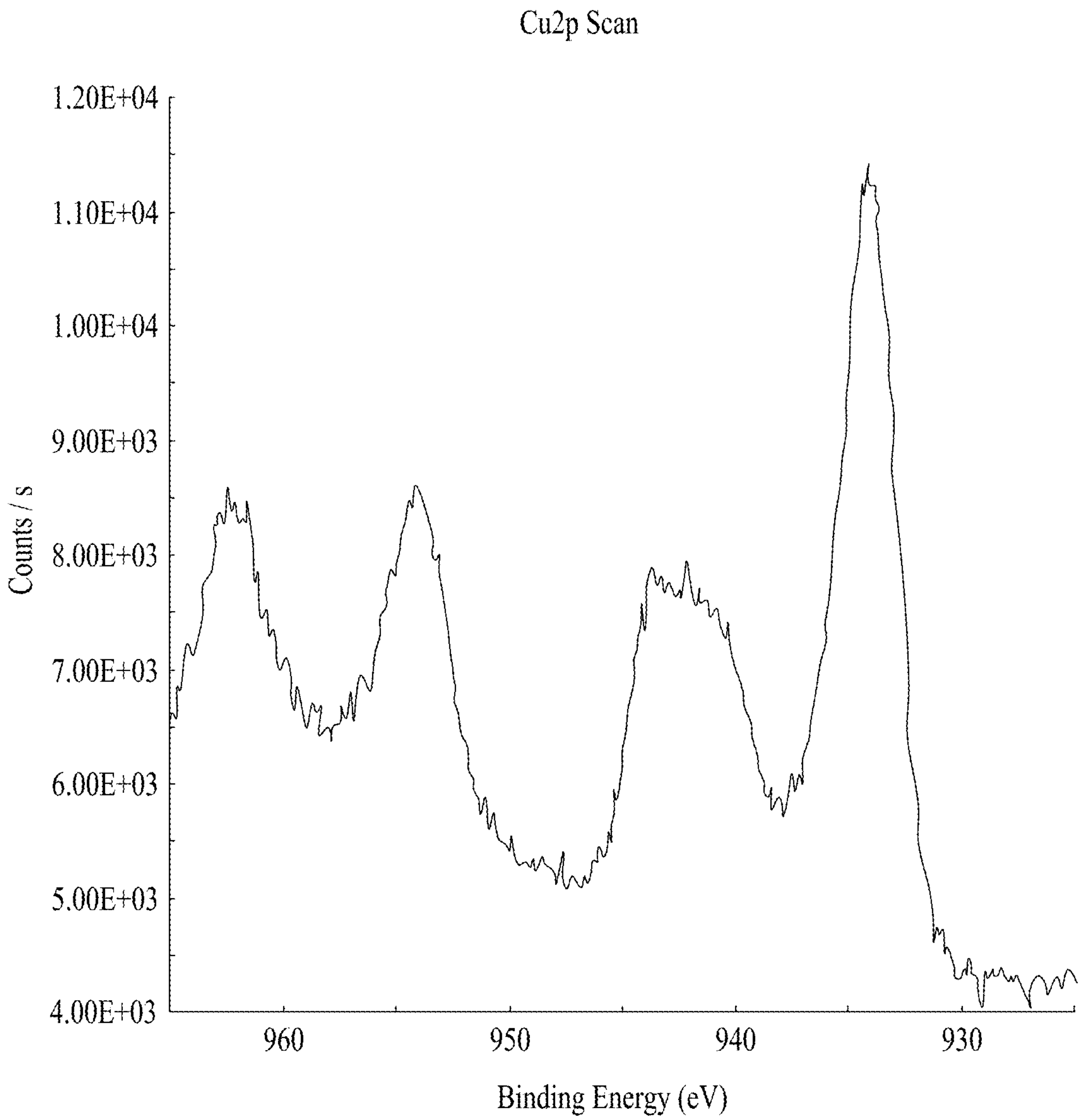

FIGS. 4 and 5 are XPS graphs showing formation of antimicrobial particles using the method of manufacturing an antimicrobial film-coated substrate according to one embodiment of the present disclosure.

FIG. 4 is an X-ray photoelectron spectroscopy (XPS) graph of antimicrobial particles formed by an embodiment of the present disclosure.

That is, the XPS graph shows an example where $Cu_2O$ antimicrobial particles are formed on a plastic or polymer substrate using a metal salt including one of copper (II) acetate ($Cu(CH_3COO)_2$), copper (II) nitrate ($Cu(NO_3)_2$), and copper (I) chloride ($CuCl_2$).

FIG. 5 is a reference graph showing the chemical structure of Cu.

Comparing FIG. 4 with FIG. 5, it can be seen that chemical bond of $Cu_2O$ is formed on the surface of the thermoplastic plastic or polymer substrate by detection of photoelectrons emitted from X-rays. In addition, the composition of the antimicrobial particles can be determined.

Figure 6A:
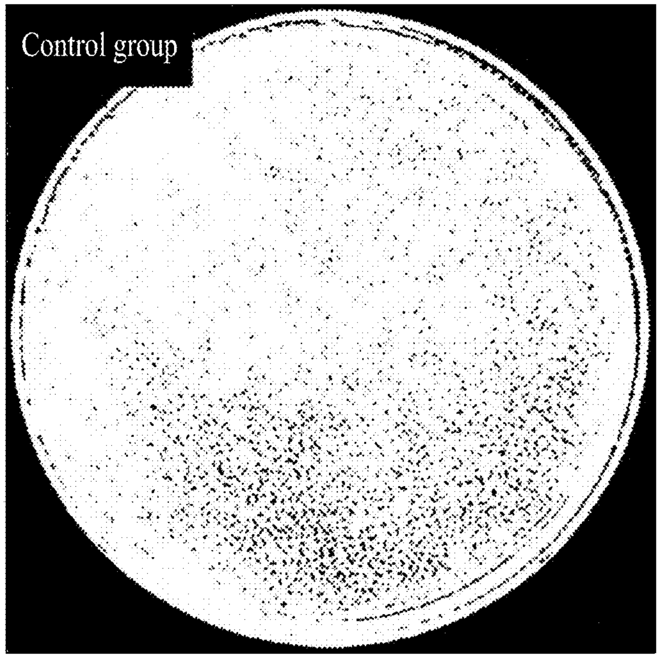
FIG. 6A shows antimicrobial performance against *Staphylococcus aureus* of control group that is not coated with an antimicrobial film.
Figure 6B:
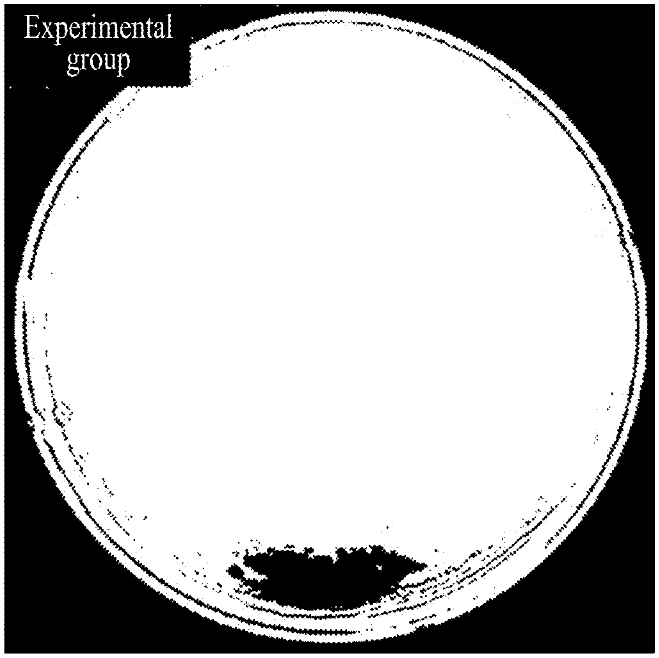
FIG. 6B shows antimicrobial performance against *Staphylococcus aureus* of the antimicrobial film-coated substrate according to one embodiment of the present disclosure.
Figure 7A:
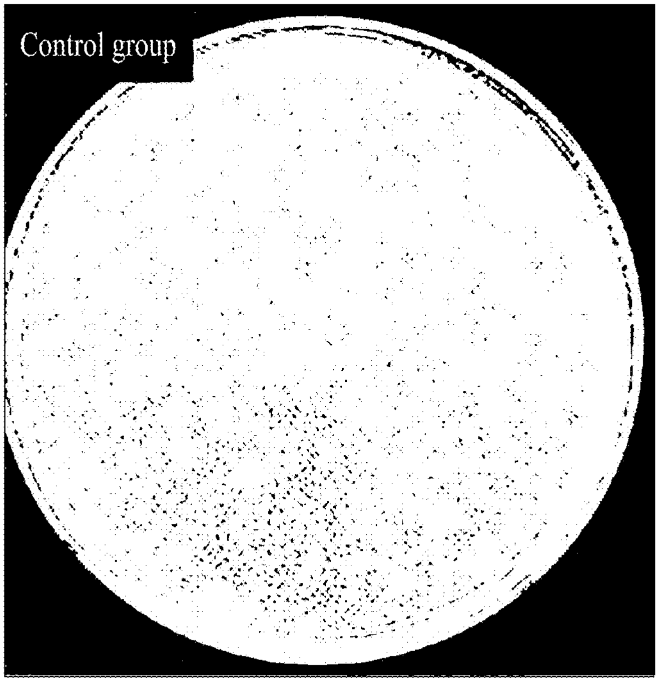
FIG. 7A shows antimicrobial performance against *E. coli* of control group that is not coated with an antimicrobial film.
Figure 7B:
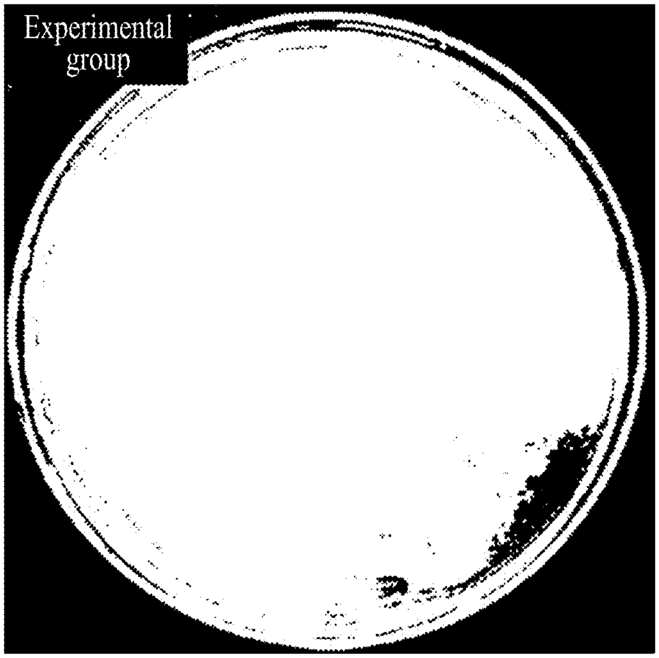
FIG. 7B shows antimicrobial performance against *E. coli* of the antimicrobial film-coated substrate according to one embodiment of the present disclosure.

FIGS. 6 and 7 are images showing the antimicrobial performance of the antimicrobial film-coated substrate according to one embodiment of the present disclosure.

FIGS. 6 and 7 show comparison in the antimicrobial performance between the case in which $Cu_2O$ antimicrobial particles are formed on a thermoplastic plastic or polymer substrate, and a control group.

FIG. 6 shows the antimicrobial performance against *Staphylococcus aureus.*

It can be seen that, compared to the control group (a) that is not coated with an antimicrobial film, the antimicrobial film-coated substrate (b) according to one embodiment of the present disclosure has excellent antimicrobial performance against *Staphylococcus aureus.*

FIG. 7 shows the antimicrobial performance against *E. coli.*

It can be seen that, compared to the control group (a) that is not coated with an antimicrobial film, the antimicrobial film-coated substrate (b) according to one embodiment of the present disclosure has excellent antimicrobial performance against *E. coli.*

Table 1 shows the results of a certified test report demonstrating the antimicrobial performance of a $Cu_2O$ antimicrobial particle layer coated on a plastic surface according to one embodiment of the present disclosure.

The test report results show that the antimicrobial film-coated substrate has an antimicrobial performance of 99.9% against *Staphylococcus aureus* and *E. coli.*

This test is conducted by the Korea Analysis Test Researcher (KATR) in accordance with the test standard JIS Z201. In addition, the sample for the test was a plastic specimen coated with 0.001 M antimicrobial particles.

24 hours before the treatment of the sample for the test, 0.4 mL of a culture solution was placed on the sample and then covered with a standard film.

TABLE 1

| Test item | | Test results | |
|---|---|---|---|
| | | Control | Sample |
| *Staphylococcus aureus* | Bacteria count after 24 hours | $4.9 \times 10^6$ | <10 |
| *Staphylococcus aureus* | Antimicrobial activity (log) | | 5.7 |
| | Bacterial reduction (%) | | 99.9 |
| Concentration of inoculated strain solution | $8.0 \times 10^5$ CFU/mL | | |
| *Escherichia coli* | Bacteria count after 24 hours | $1.9 \times 10^7$ | <10 |
| *Escherichia coli* | Antimicrobial activity (log) | | 6.3 |
| | Bacterial reduction (%) | | 99.9 |
| Concentration of inoculated strain solution | $4.0 \times 10^5$ CFU/mL | | |

Figure 8:
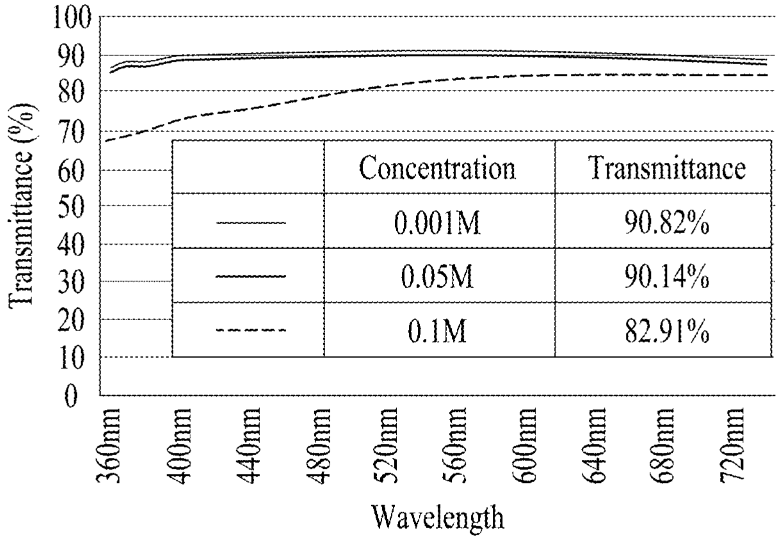
FIG. 8 is a graph showing transparency depending on the concentration of the metal salt coating solution in the method of manufacturing an antimicrobial film-coated substrate according to one embodiment of the present disclosure.

FIG. 8 is a graph showing transparency according to the concentration of the metal salt coating solution in the method of manufacturing an antimicrobial film-coated substrate according to one embodiment of the present disclosure.

As described above, by controlling the concentration of the metal salt coating solution, the size and density of antimicrobial particles formed on the surface of a thermoplastic plastic or polymer substrate may be controlled.

In addition, by controlling the concentration of the metal salt coating solution, the transmittance of the antimicrobial particle layer formed on the surface of a thermoplastic plastic or polymer substrate may be controlled.

It can be seen from the graph of FIG. 8 that, when the concentration of the metal salt coating solution is 0.001M and 0.05M, the transmittance is approximately uniform depending on the wavelength.

On the other hand, it can be seen that, when the concentration of the metal salt coating solution is 0.1 M, the transmittance for light in the range of a short wavelength may be slightly reduced. However, it can be seen that, within the visible light range, the transmittance increases slightly depending on the wavelength, but is generally uniform.

As can be seen from the table inside the graph of FIG. 8, the transmittance according to the concentration of the metal salt coating solution is measured based on the light with a wavelength of 550 nm, which has the highest sensitivity within the visible light range.

As such, at the 550 nm wavelength, when the concentration of the metal salt coating solution is 0.001 M, the transparency is 90.82%, and when the concentration of the metal salt coating solution is 0.05 M, the transparency decreases slightly to 90.14%. In addition, when the concentration of the metal salt coating solution is 0.1 M, the transparency decreases to 82.91%. In other words, as the concentration of the metal salt decreases, the transmittance of the antimicrobial particle layer may increase.

As such, it can be seen that the transmittance of the antimicrobial particle layer formed by the metal salt coating solution may be controlled by adjusting the concentration of the metal salt coating solution.

The above description is merely illustrative of the technical concept of the present disclosure, and various modifications and variations can be made by those skilled in the art, to which the present disclosure pertains, without departing from the essential characteristics of the present disclosure.

Therefore, the embodiments disclosed in the present disclosure are not intended to limit the technical concept of the present disclosure, but are for the purpose of explanation, and the scope of the technical concept of the present disclosure is non-limited by this embodiment.

The scope of protection of the present disclosure should be construed based on the following claims, and all technical ideas within the equivalent scope thereof should be construed as being included in the scope of the rights of the present disclosure.

INDUSTRIAL APPLICABILITY

The present disclosure may provide an antimicrobial film-coated substrate applicable to plastic products or polymer substrates and a method of manufacturing the same.

What is claimed is:

1. A method of manufacturing an antimicrobial film-coated substrate configured to directly form antimicrobial particles, the method comprising:

mixing a metal salt with a hydrophobic solvent to prepare a coating solution;

coating a surface of a plastic or polymer substrate with the coating solution; and heat-treating the coated plastic or polymer substrate to form an antimicrobial particle layer on the surface of the plastic or polymer substrate, wherein the heat-treating comprises inducing an oxidation reaction and an aggregation reaction and melting the surface of the plastic or polymer substrate to fix antimicrobial particles of the antimicrobial particle layer to the surface of the plastic or polymer substrate.

2. The method according to claim 1, wherein the hydrophobic solvent comprises at least one of ethanol, isopropanol, or methanol.

3. The method according to claim 1, wherein the plastic is a thermoplastic plastic.

4. The method according to claim 1, wherein the metal salt comprises at least one of a metal acetate-based material, a metal chloride-based material, or a metal nitrate-based material.

5. The method according to claim 4, wherein at least one of the metal acetate-based material, the metal chloride-based material, or the metal nitrate-based material comprises copper (Cu).

6. The method according to claim 1, wherein a concentration of the metal salt is 0.001 M (molar concentration) to 0.1 M.

7. The method according to claim 6, further comprising controlling the concentration of the coating solution to adjust a size of the antimicrobial particles, wherein the size of the antimicrobial particles increases as the concentration of the metal salt increases.

8. The method according to claim 6, further comprises controlling the concentration of the coating solution to adjust a transmittance of a layer composed of the antimicrobial particles, wherein the transmittance of the antimicrobial particle layer increases as the concentration of the metal salt decreases.

9. The method according to claim 1, wherein the metal salt comprises one of copper (II) acetate ($Cu(CH_3COO)_2$), copper (II) nitrate ($Cu(NO_3)_2$), or copper (I) chloride ($CuCl_2$).

10. An antimicrobial film-coated substrate manufactured according to claim 1.

11. A method of manufacturing an antimicrobial film-coated substrate, the method comprising:

mixing a metal salt including at least one of a metal acetate-based material, a metal chloride-based material, or a metal nitrate-based material with an alcohol-based solvent to prepare a coating solution;

coating a surface of a plastic or polymer substrate with the coating solution; and heat-treating the coated plastic or polymer substrate to form an antimicrobial particle layer on the surface of the plastic or polymer substrate, wherein the heat-treating comprises inducing an oxidation reaction and an aggregation reaction and melting the surface of the plastic or polymer substrate to fix antimicrobial particles of the antimicrobial particle layer to the surface of the plastic or polymer substrate.

12. The method according to claim 11, wherein concentration of the metal salt is 0.001 M (molar concentration) to 0.1 M.

13. The method according to claim 12, further comprising controlling the concentration of the coating solution to adjust a size of the antimicrobial particles, wherein the size of the antimicrobial particles increases as the concentration of the metal salt increases.

14. The method according to claim 12, further comprises controlling the concentration of the coating solution to adjust a transmittance of a layer composed of the antimicrobial particles, wherein the transmittance of the antimicrobial particle layer increases as the concentration of the metal salt decreases.

15. The method according to claim 11, wherein the metal salt comprises one of copper (II) acetate ($Cu(CH_3COO)_2$), copper (II) nitrate ($Cu(NO_3)_2$), or copper (I) chloride ($CuCl_2$).

* * * * *